US009342845B1

(12) United States Patent
Haugen et al.

(10) Patent No.: US 9,342,845 B1
(45) Date of Patent: May 17, 2016

(54) DETERMINING AN ORDER OF PARTICIPATION FOR PARTICIPANTS OF A MULTI-PARTY COMMUNICATION SESSION

(71) Applicant: Google Inc., Mountain View, CA (US)

(72) Inventors: Frances Bordwell Haugen, Mountain View, CA (US); Alexander Ketner Unger, San Francisco, CA (US)

(*) Notice: Subject to any disclaimer, the term of this patent is extended or adjusted under 35 U.S.C. 154(b) by 361 days.

(21) Appl. No.: 13/724,675

(22) Filed: Dec. 21, 2012

(51) Int. Cl.
*G06F 13/00* (2006.01)
*G06Q 30/02* (2012.01)

(52) U.S. Cl.
CPC .................. *G06Q 30/0277* (2013.01)

(58) Field of Classification Search
CPC ............. G06Q 10/107; G06Q 30/0277; H04L 12/585; H04L 12/58; H04L 12/581; H04L 12/5855
USPC .......................................................... 709/206
See application file for complete search history.

(56) References Cited

U.S. PATENT DOCUMENTS

| 5,860,023 | A | * | 1/1999 | Tognazzini | 710/15 |
| 8,684,807 | B1 | * | 4/2014 | Crici | 463/9 |
| 8,744,891 | B1 | * | 6/2014 | Medina, III | 705/7.26 |
| 2006/0074788 | A1 | * | 4/2006 | Grizack et al. | 705/35 |
| 2013/0103445 | A1 | * | 4/2013 | Alonso Lord et al. | 705/7.14 |

OTHER PUBLICATIONS

Haugen et al., "Concierge Hangouts", dated Mar. 19, 2012, 28 pages.

* cited by examiner

*Primary Examiner* — Robert B Harrell
(74) *Attorney, Agent, or Firm* — Patent Law Works LLP

(57) ABSTRACT

A system and method for queuing participants of a multi-party communication session are disclosed. In one embodiment, the system includes a concentration signal module, a concentration information module, an ordering module and a queuing module. The concentration signal module receives one or more concentration signals associated with a multi-party communication session. The concentration information module receives concentration information of a participant of the multi-party communication session. The ordering module determines an order for a plurality of participants of the multi-party communication session based at least in part on the one or more concentration signals and the concentration information of each participant of the multi-party communication session. The queuing module queues the plurality of participants of the multi-party communication session in the determined order, wherein a participant at the front of the queue asks a question.

19 Claims, 5 Drawing Sheets

DETERMINING AN ORDER OF PARTICIPATION FOR PARTICIPANTS OF A MULTI-PARTY COMMUNICATION SESSION

BACKGROUND

A multi-party communication session may include a plurality of participants who are able to communicate with one another. A multi-party communication session may be used as a forum to answer questions. For example, a multi-party communication session may be associated with an advertisement allowing a moderator (e.g. a customer service representative of the advertiser) to interact with potential customers and answer questions. In another example, a multi-party communication session may be used by a professor during office hours.

It is possible that multiple participants may desire to ask a question in a multi-party communication session. Therefore, it is desirable to have a process for queuing participants of the multi-party communication session in order to determine whose turn it is to ask a question and to reduce participants speaking over or otherwise interrupting one another. However, current systems do not queue participants of a multi-party communication session, e.g., a multi-party communication session associated with an advertisement.

SUMMARY

The specification overcomes the deficiencies and limitations of the prior art at least in part by providing a system and method for queuing participants of a multi-party communication session.

According to one innovative aspect of the subject matter described in this disclosure, a concentration signal module receives one or more concentration signals associated with a multi-party communication session. A concentration information module receives concentration information of a participant of the multi-party communication session. An ordering module determines an order for a plurality of participants of the multi-party communication session based at least in part on the one or more concentration signals and the concentration information of each participant of the multi-party communication session. A queuing module queues the plurality of participants of the multi-party communication session in the determined order, wherein a participant at the front of the queue asks a question.

In general, another innovative aspect of the subject matter described in this disclosure may be embodied in methods that include: receiving, using one or more devices, one or more concentration signals associated with a multi-party communication session; receiving, using one or more devices, concentration information of a participant of the multi-party communication session; determining, using the one or more devices, an order for a plurality of participants of the multi-party communication session based at least in part on the one or more concentration signals and the concentration information of each participant of the multi-party communication session; and queuing, using the one or more devices, the plurality of participants of the multi-party communication session in the determined order, wherein a participant at the front of the queue asks a question.

Other aspects include corresponding methods, systems, apparatus and computer program products. These and other implementations may each optionally include one or more of the following features. For instance, the features further include receiving, using the one or more devices, a request to modify the order of the queued participants, wherein the request to modify is received from a moderator associated with the multi-party communication session; and modifying, using the one or more devices, the order of the queued participants based at least in part on the request to modify the order. For instance, the features further include that the concentration information associated with the participant is received and the order is determined in response to the participant joining the multi-party communication session. For instance, the features further include presenting, using the one or more devices, queue positions to a predetermined number of participants at the front of the queue; and wherein the order of the predetermined number of participants at the front of the queue is not modified backward after presenting the queue positions. For instance, the features further include presenting, using the one or more devices, an expectation indicator to at least a subset of the plurality of queued participants. For instance, the features further include receiving, using the one or more devices, a request to advance the queue from a moderator associated with the multi-party communication session after the question is answered; and advancing, using the one or more devices, the queue such that a next participant is advanced to the front of the queue, wherein the next participant asks a next question. For instance, the features further include receiving, using the one or more devices, multi-party communication session information; detecting, using the one or more devices, a queue advancement signal based on the multi-party communication information, the queue advancement signal indicating that the question is answered; and automatically advancing, using the one or more devices, the queue such that a next participant is advanced to the front of the queue, wherein the next participant asks a next question. For instance, the features further include that at least one concentration signal is based at least in part on a demographic, and the concentration information received includes information about the participant's demographic. For instance, the features include that the multi-party communication session is associated with an advertisement.

The features and advantages described herein are not all-inclusive and many additional features and advantages will be apparent in view of the figures and description. Moreover, it should be noted that the language used in the specification has been principally selected for readability and instructional purposes, and not to limit the scope of the subject matter disclosed herein.

BRIEF DESCRIPTION OF THE DRAWINGS

The embodiments are illustrated by way of example, and not by way of limitation in the figures of the accompanying drawings in which like reference numerals are used to refer to similar elements.

DETAILED DESCRIPTION

Figure 1:
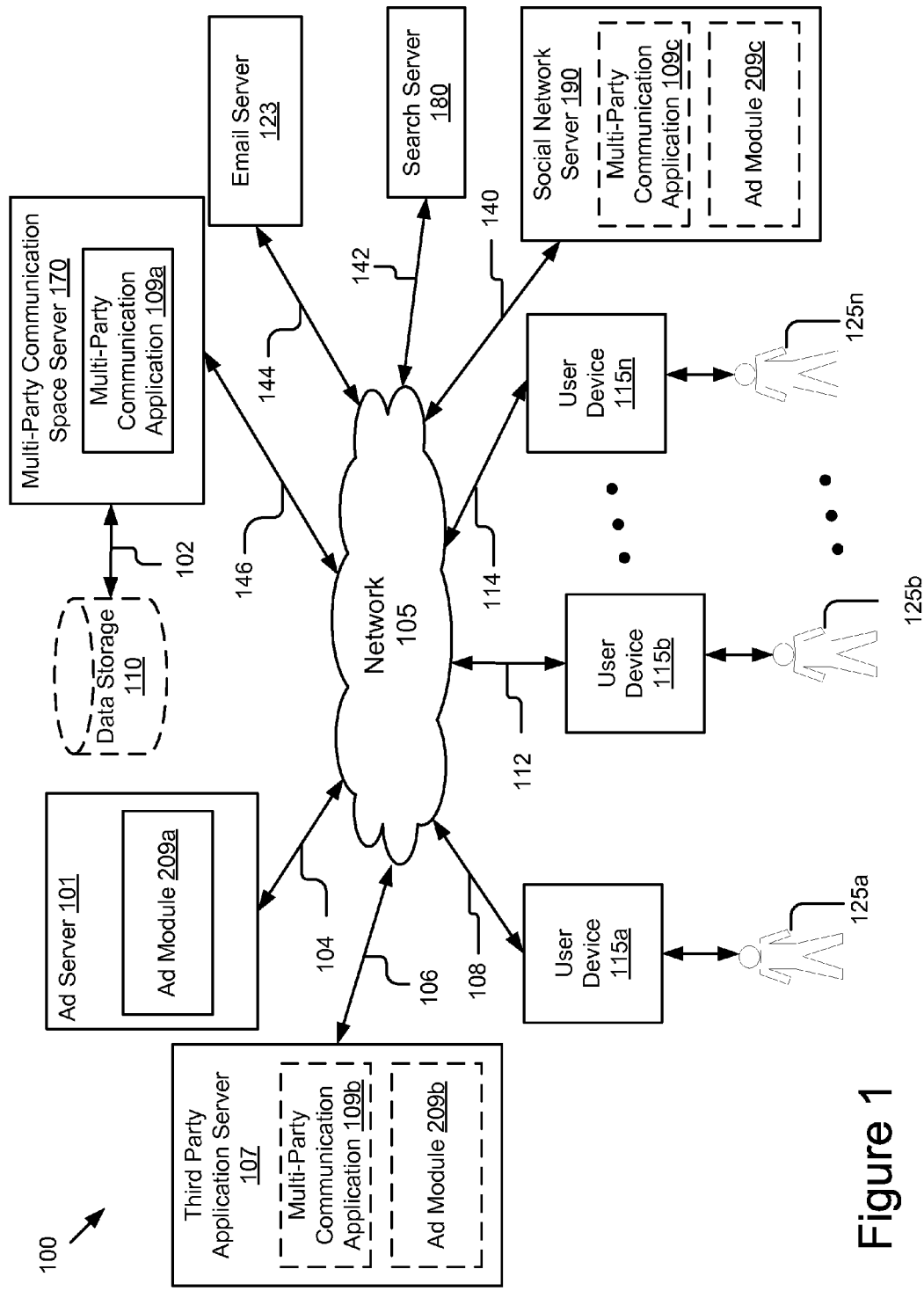
FIG. 1 illustrates a system for queuing participants of a multi-party communication session according to one embodiment.

A system and method for queuing participants of a multi-party communication session are disclosed. As an example, when a user searches for "how to lower my car insurance rate." As part of delivering that webpage, the search terms may be matched by a server to an advertisement for an insurance carrier. The advertisement may have therewith associated a communication session, in which the user can participate by clicking a link. When the user clicks that link, he/she may be connected via a multi-party communication session (e.g., a chat session, voice conference, or video conference) to a moderator associated with the insurance carrier. The moderator answers questions of the participants of the multi-party communication session. Since multiple participants may have questions, it is desirable to provide a mechanism for queuing participants of the multi-party communication session.

In one embodiment, the user is added to a queue of participants. The moderator answers questions of the queued participants in the order queued. When the moderator has answered the question(s) of the participant at the front of the queue, the queue is advanced and the next queued participant asks his/her question. When the user reaches the front of the queue the user may ask his/her question (i.e. how to lower his/her car insurance rate).

In one embodiment, the order in which the participants are queued is determined based at least in part on a concentration signal and concentration information of each participant. In one embodiment, a concentration signal is a rule used to determine an order for the participants, which may cause participants satisfying the rule to be concentrated together in the order. For example, a concentration signal may include concentrating participants of a certain demographic when the participants are ordered, and the concentration information includes demographic information of the participants. For example, a concentration signal is based on the demographic of age (e.g. under 18, 18-24, 24-50, and 50+) is received, the ages (i.e. concentration information) of the participants are received, and an order is determined concentrating participants having an age under 18 together in the order, participants having an age 18-24 together in the order, and so on.

In the following description, for purposes of explanation, numerous specific details are set forth in order to provide a thorough understanding of the embodiments. It will be apparent, however, to one skilled in the art that the embodiments can be practiced without these specific details. In other instances, structures and devices are shown in block diagram form in order to avoid obscuring the embodiments. For example, one embodiment is described below with reference to user interfaces and particular hardware. However, the present embodiments apply to any type of computing device that can receive data and commands, and any peripheral devices providing services.

Reference in the specification to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms including, for example, "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present embodiments also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, including, but not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

The embodiments can take the form of an entirely hardware embodiment, an entirely software embodiment or an embodiment containing both hardware and software elements. An exemplary embodiment is implemented in software, which includes but is not limited to firmware, resident software, microcode, etc.

Furthermore, the embodiments can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the present embodiments are not described with reference to any particular programming language. It will be appreciated that a variety of programming languages may be used to implement the teachings of the embodiments as described herein.

FIG. 1 illustrates a block diagram of a system 100 for queuing participants of a multi-party communication session according to one embodiment. The illustrated system 100 includes user devices 115a, 115b, and 115n (also referred to collectively as user devices 115 or individually as user device 115) that are accessed by users 125a, 125b, and 125n (also referred to collectively as users 125 or individually as user 125), an ad server 101, a multi-party communications space server 170, an e-mail server 123, a search server 180, a social network server 190 and a third party application server 107. In the illustrated embodiment, these entities are communicatively coupled via a network 105. Although only three user devices 115 are illustrated, any number of user devices 115 are available to any number of users 125.

The user devices 115 in FIG. 1 are used by way of example. While FIG. 1 illustrates three user devices 115, the present specification applies to any system architecture having one or more user devices 115. Furthermore, while only one network 105 is coupled to the user devices 115, the third party application server 107, the ad server 101, the search server 180, the e-mail server 123, the social network server 190 and the multi-party communications space server 170, in practice any number of networks 105 can be connected to the entities. Furthermore, while only one third party server 107, one email server 123, one search server 180 and one social network server 190 are shown, the system 100 can include any number of servers 107, 123, 180 and 190.

Although only one multi-party communication space server 170 is shown, it will be recognized that multiple servers 170 may be present. In one embodiment, the multi-party communication space server 170 comprises, or is comprised within, a social network. A social network is any type of social structure where the users are connected by a common feature. Examples include, but are not limited to, blogs, micro-blogs and Internet forums. The common feature includes friendship, family, a common interest, etc.

In one embodiment, a multi-party communication application 109a is included in the multi-party communication space server 170 and is operable on the multi-party communication space server 170, which is connected to the network 105 via signal line 146. In another embodiment, a multi-party communication application 109b is included in the third party application server 107 and is operable on the third party application server 107, which is connected to the network 105 via signal line 106. In another embodiment, a multi-party communication application 109c is included in the social network server 190 and is operable on the social network server 190, which is connected to the network 105 via signal line 140. In yet another embodiment, a multi-party communication application (not shown) may be included in one or more of the other computing devices 115, 123 and is operable on the one or more other devices 115, 123, respectively. It will be recognized that the multi-party communication application 109a/109b/109c (referred to generally as the multi-party communication application 109) can be stored in any combination on the servers 101, 107, 170, 190 and user devices 115. In some embodiments, the multi-party communication application 109 includes multiple, distributed modules that cooperate with each other to perform the functions described below. Details describing the functionality and components of the multi-party communication application 109 are explained in further detail below with regard to FIGS. 3 and 4.

Although only one ad server 101 is shown, it will be recognized that multiple ad servers 101 may be present. In one embodiment, an ad module 209a is included in the ad server 101 and is operable on the ad server 101, which is connected to the network 105 via signal line 104. In another embodiment, an ad module 209b is included in the third party application server 107 and is operable on the third party application server 107, which is connected to the network 105 via signal line 106. In another embodiment, an ad module 209c is included in the social network server 190 and is operable on the social network server 190, which is connected to the network 105 via signal line 140. In yet another embodiment, an ad module (not shown) may be included in one or more of the other computing devices 115, 123 and is operable on the one or more other devices 115, 123, respectively. It will be recognized that the ad module 209a/220b/220c (referred to generally as the ad module 209) can be stored in any combination on the servers 101, 107, 170, 190 and user devices 115. In some embodiments, the ad module 209 includes multiple, distributed modules that cooperate with each other to perform the functions described below. Details describing the functionality and components of the ad module 209 are explained in further detail below with regard to FIG. 2.

The network 105 enables communications between user devices 115, the ad server 101, the multi-party communication space server 170, the search server 180, the e-mail server 123, the social network server 190 and the third party application 107 server. Thus, the network 105 can include links using technologies including, for example, Wi-Fi, Wi-Max, 2G, Universal Mobile Telecommunications System (UMTS), 3G, Ethernet, 802.11, integrated services digital network (ISDN), digital subscriber line (DSL), asynchronous transfer mode (ATM), InfiniBand, PCI Express Advanced Switching, etc. Similarly, the networking protocols used on the network 105 can include the transmission control protocol/Internet protocol (TCP/IP), multi-protocol label switching (MPLS), the User Datagram Protocol (UDP), the hypertext transport protocol (HTTP), the simple mail transfer protocol (SMTP), the file transfer protocol (FTP), lightweight directory access protocol (LDAP), Code Division Multiple Access (CDMA), Wideband Code Division Multiple Access (WCDMA), Global System for Mobile communications (GSM), High-Speed Downlink Packet Access (HSDPA), etc. The data exchanged over the network 105 can be represented using technologies and/or formats including the hypertext markup language (HTML), the extensible markup language (XML), etc. In addition, all or some of links can be encrypted using conventional encryption technologies, for example, the secure sockets layer (SSL), Secure HTTP and/or virtual private networks (VPNs) or Internet Protocol security (IPsec). In another embodiment, the entities can use custom and/or dedicated data communications technologies instead of, or in addition to, the ones described above. Depending upon the embodiment, the network 105 can also include links to other networks.

In one embodiment, the network 105 is a partially public or a wholly public network, for example, the Internet. The network 105 can also be a private network or include one or more distinct or logical private networks (e.g., virtual private networks, Wide Area Networks ("WAN") and/or Local Area Networks ("LAN")). Additionally, the communication links to and from the network 105 can be wireline or wireless (i.e., terrestrial or satellite-based transceivers). In one embodiment, the network 105 is an IP-based wide or metropolitan area network.

In some embodiments, the network 105 helps to form a set of online relationships between users 125, for example, those provided by one or more social networking systems including explicitly-defined relationships and relationships implied by social connections with other online users, where the relationships form a social graph. In some examples, the social graph can reflect a mapping of these users and how they are related.

In the illustrated embodiment, the user devices 115a, 115b and 115n are coupled to the network 105 via signal lines 108, 112 and 114, respectively. The user 125a can interact with the user device 115a. Similarly, the user 125b can interact with the user device 115b, and the user 125n can interact with the user device 115n. The third party application server 107 is communicatively coupled to the network 105 via signal line 106. The e-mail server 123 is communicatively coupled to the network 105 via signal line 144. The search server 180 is communicatively coupled to the network 105 via signal line 142. The ad server 101 is communicatively coupled to the network 105 via signal line 104. The multi-party communication space server 170 is communicatively coupled to the network 105 via signal line 146. In one embodiment, the multi-party communication space server 170 is communicatively coupled to data storage 110 via signal line 102. The social network server 190 is communicatively coupled to the network 105 via signal line 140.

In one embodiment, the data storage 110 stores data and information including multi-party communication session data. In one embodiment, multi-party communication session data includes one or more concentration signals associated with a multi-party communication session. In one embodiment, multi-party communication session data includes multi-party communication information, e.g., a recording of the communications of the multi-party communication session. In one embodiment, the data storage 110 stores data and information including concentration information associated with each user 125 of the system 100. In one embodiment, which is discussed below, a storage device 214 (see FIG. 2) is included in the multi-party communication space server 170 (i.e., a computing device 200) and the storage device 214 stores the data and information including one or more of multi-party communication session data and concentration information.

In one embodiment, the user device 115 is an electronic device having a web browser (not shown) for interacting with the various servers 101, 107, 123, 170, 180, 190 and user devices 115 of the system 100 via the network 105 and is used by a user 125 to access information in the system 100. The user device 115 can be, for example, a laptop computer, a desktop computer, a tablet computer, a mobile telephone, a personal digital assistant (PDA), a mobile email device, a portable game player, a portable music player or any other electronic device capable of accessing a network. One having ordinary skill in the art will recognize that other types of client devices 115 are possible. In one embodiment, the system 100 comprises a combination of different types of client devices 115. For example, a combination of a personal computer, a mobile phone and a tablet computer. The user 125 is a human user of the user device 115.

Figure 2:
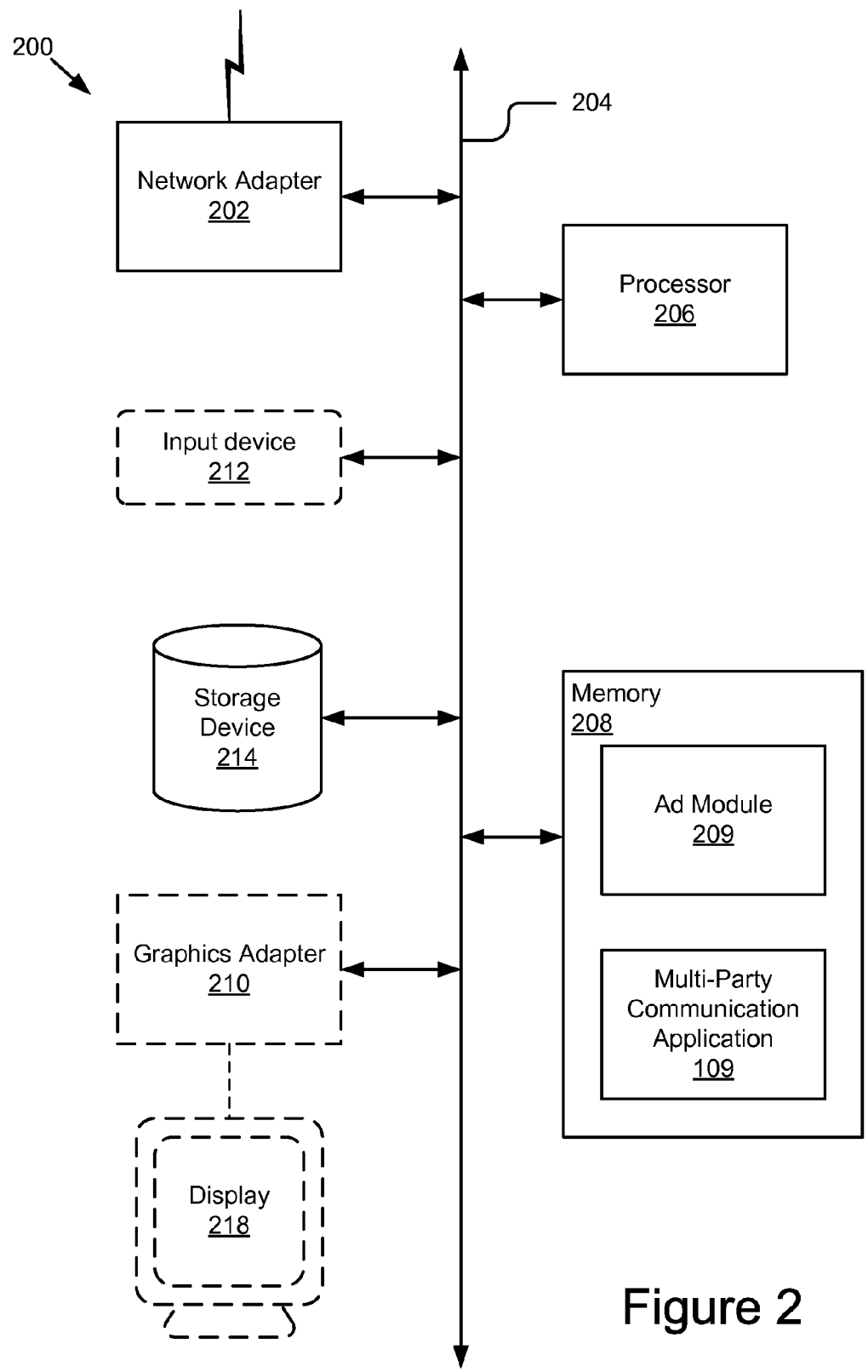
FIG. 2 is a block diagram illustrating a computing device according to one embodiment.

FIG. 2 is a block diagram of a computing device 200 according to one embodiment. As illustrated in FIG. 2, the computing device 200 includes a network adapter 202, processor 206, memory 208 and a storage device 214 coupled to a bus 204. In one embodiment, the memory 208 includes one or more of an ad module 209 and a multi-party communication application 109. In one embodiment, the functionality of the bus 204 is provided by an interconnecting chipset. According to one embodiment also coupled to the bus 204 are a graphics adapter 210, an input device 212, a graphics adapter 210 and a display 218, which is coupled to the graphics adapter 210.

The network adapter 202 sends data to and receives data from the various system 100 components (e.g. user devices 115 and ad server 101). The network adapter 202 is coupled to the bus 204. In one embodiment, the network adapter 202 includes a port for direct physical connection to the network 105 or to another communication channel. For example, the network adapter 202 includes a USB, SD, CAT-5 or similar port for wired communication with the network 105. In another embodiment, the network adapter 202 includes a wireless transceiver for exchanging data with the network 105, or with another communication channel, using one or more wireless communication methods, such as IEEE 802.11, IEEE 802.16, BLUETOOTH®, near field communication (NFC) or another suitable wireless communication method.

The processor 206 may be any general-purpose processor. The processor 206 comprises an arithmetic logic unit, a microprocessor, a general purpose controller or some other processor array to perform computations and execute code and routines. The processor 206 is coupled to the bus 204 for communication with the other components of the computing device 200. Processor 206 processes data signals and may comprise various computing architectures including a complex instruction set computer (CISC) architecture, a reduced instruction set computer (RISC) architecture, or an architecture implementing a combination of instruction sets. Although only a single processor 206 is shown in FIG. 2, multiple processors may be included. The processing capability may be limited to supporting the display of images and the capture and transmission of images. The processing capability might be enough to perform more complex tasks, including various types of feature extraction and sampling. The computing device 200 also includes an operating system executable by the processor including but not limited to WINDOWS®, MacOS X, Android or UNIX® based operating systems. It will be recognized that other processors, operating systems, sensors, displays and physical configurations are possible.

The memory 208 is a non-transitory storage medium. The memory 208 holds instructions and/or data that may be executed by the processor 206. In one embodiment, the instructions and/or data stored on the memory 208 comprise code for performing any and/or all of the techniques described herein. The memory 208 may be a dynamic random access memory (DRAM) device, a static random access memory (SRAM) device, flash memory or some other memory device known in the art. In one embodiment, the memory 208 also includes a non-volatile memory or similar permanent storage device and media, for example, a hard disk drive, a floppy disk drive, a CD-ROM device, a DVD-ROM device, a DVD-RAM device, a DVD-RW device, a flash memory device, or some other mass storage device known in the art for storing information on a more permanent basis. The memory 208 is coupled by the bus 204 for communication with the other components of the computing device 200. In one embodiment, one or more of the ad module 209 and the multi-party communication application 109 are stored in memory 208 and executable by the processor 206.

In one embodiment, the computing device 200 includes an ad module 209. For example, in one embodiment, the computing device 200 is an ad server 101. The ad module 209 includes code and routines executable by the processor 206 for selecting an advertisement for display. In one embodiment, the ad module 209 is a set of instructions executable by the processor 206. In another embodiment, the ad module 209 is stored in the memory 208 and is accessible and executable by the processor 206.

In one embodiment, the ad module 209 selects an advertisement associated with a multi-party communication session. In one embodiment, the ad module 209 selects an advertisement associated with a multi-party communication session based at least in part on a keyword signal. In one embodiment, an advertisement associated with a multi-party communication session builds a brand associated with advertisement. For example, in one embodiment, a multi-party communication session associated with an advertisement is staffed by an employee or representative of the advertiser who acts as a moderator and can answer questions. The advertiser receives goodwill from users who receive answers to questions, and the advertiser has a stronger brand because of the interaction with users.

In one embodiment, the computing device 200 includes a multi-party communication application 109. For example, in one embodiment, the computing device 200 is a multi-party communication space server 170. The multi-party communication application 109 includes code and routines executable by the processor 206 for initiating and maintaining a multi-party communication session and for queuing participants of a multi-party communication session. In one embodiment, the multi-party communication application 109 is a set of instructions executable by the processor 206. In another embodiment, the multi-party communication application 109 is stored in the memory 208 and is accessible and executable by the processor 206. Details describing the functionality and components of the multi-party communication application 109 are explained in further detail below in reference to FIGS. 3 and 4.

In one embodiment, the computing device 200 is a social network server 190. An embodiment of the social network server 190 allows users 125 of user devices 115 to perform social functions between other users 125 of user devices 115 within the system 100. In one embodiment, the social network server 190 comprises, or is comprised within, a social network. In another embodiment, the computing device 200 is an email server 123. In another embodiment, the computing device 200 is a third party server 107. In another embodiment, the computing device 200 is a search server 180.

The storage device 214 is any device capable of holding data, like a hard drive, compact disk read-only memory (CD-ROM), DVD, or a solid-state memory device. The storage device 214 is a non-volatile memory device or similar permanent storage device and media. The storage device 214 stores data and instructions for processor 208 and comprises one or more devices including a hard disk drive, a floppy disk drive, a CD-ROM device, a DVD-ROM device, a DVD-RAM device, a DVD-RW device, a flash memory device, or some other mass storage device known in the art. In one embodiment, the computing device 200 is an ad server 101 and the storage device 214 stores data and information of each advertisement of the ad server 101. In one embodiment, the computing device 200 is a multi-party communication space server 170 and the storage device 214 stores data and information including one or more of multi-party communication session data and concentration information.

The input device 212 may include a mouse, track ball, or other type of pointing device to input data into the computing device 200. The input device 212 may also include a keyboard, for example, a QWERTY keyboard or any other physical or soft keyboard in any language. The input device 212 may also include a microphone, a web camera or similar audio or video capture device. The graphics adapter 210 displays images and other information on the display 218. The display 218 is a conventional type, for example, a liquid crystal display (LCD) or any other similarly equipped display device, screen, touchscreen or monitor. The display 218 represents any device equipped to display electronic images and data as described herein. The network adapter 202 couples the computing device 200 to a local or wide area network.

As is known in the art, a computing device 200 can have different and/or other components than those shown in FIG. 2. For example, the computing device can have speakers or another form of audio output. Moreover, the computing device 200 can lack certain illustrated components. For example, in one embodiment, the computing device 200 is a multi-party communication space server 170 and lacks an input device 212, graphics adapter 210 and/or display 218. Moreover, the storage device 214 can be local and/or remote from the computing device 200 (e.g., a storage area network (SAN)).

As is known in the art, the computing device 200 is adapted to execute computer program modules for providing the functionality described herein. As used herein, the term "module" refers to computer program logic utilized to provide the specified functionality. Thus, a module can be implemented in hardware, firmware, and/or software. In one embodiment, program modules are stored on the storage device 214, loaded into the memory 208 and executed by the processor 206.

Embodiments of the entities described herein can include other and/or different modules than the ones described here. In addition, the functionality attributed to the modules can be performed by other or different modules in other embodiments. Moreover, this description occasionally omits the term "module" for purposes of clarity and convenience.

Figure 3:
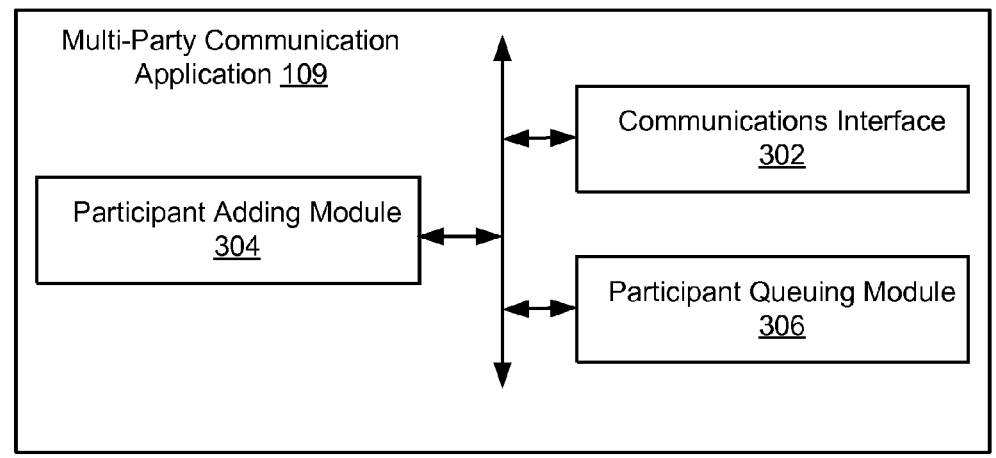
FIG. 3 is a block diagram illustrating a multi-party communication application according to one embodiment.

Referring now to FIG. 3, the multi-party communication application 109 is shown in more detail according to one embodiment. FIG. 3 is a block diagram of the multi-party communication application 109 included in a computing device 200 (e.g., a multi-party communication space server 170) according to one embodiment.

In one embodiment, the multi-party communication application 109 comprises a communications interface 302, a participant adding module 304 and a participant queuing module 306.

It will be recognized that the modules 302, 304, 306 comprised in the multi-party communication application 109 are not necessarily all on the same computing device 200. In one embodiment, the modules 302, 304, 306 are distributed across multiple computing devices 200. For example, in one embodiment, the participant queuing module 306 is included in one multi-party communication space server 170 and the other modules 302, 304 are included in another multi-party communication space server 170. It will be recognized that the preceding is just an example of distributing modules across multiple computing devices 200 and that other examples exist.

The communication interface 302 includes code and routines for handling communications between the participant adding module 304, the participant queuing module 306 and other components of the computing device 200. In one embodiment, the communication interface 302 is a set of instructions executable by the processor 206. In another embodiment, the communication interface 302 is stored in the memory 208 and is accessible and executable by the processor 206. In either embodiment, the communication interface 302 is adapted for cooperation and communication with the processor 206, other components of the computing device 200 and other components of the multi-party communication application 109.

The communication interface 302 handles communications between the participant adding module 304, the participant queuing module 306 and other components of the computing device 200. For example, the communication interface 202 communicates with the participant adding module 304 and the participant queuing module 306 to pass the output of the participant adding module 304 (i.e., a new participant signal according to one embodiment) to the participant queuing module 306. However, this description may occasionally omit mention of the communication interface 302 for purposes of clarity and convenience. For example, for purposes of clarity and convenience, the above scenario may be described as the participant adding module 304 passing the new participant signal to the participant queuing module 306.

The participant adding module 304 includes code and routines for adding a participant to a multi-party communication session. In one embodiment, the participant adding module 304 is a set of instructions executable by the processor 206. In another embodiment, the participant adding module 304 is stored in the memory 208 and is accessible and executable by the processor 206. In either embodiment, the participant adding module 304 is adapted for cooperation and communication with the processor 206, other components of the computing device 200 and other components of the multi-party communication application 109.

The participant adding module 304 adds a participant to a multi-party communication session. An embodiment of the multi-party communication application 109 allows participants of a multi-party communication session to communicate. For example, in one embodiment, participants of the multi-party communication session are all connected to the computing device 200, which is a central server including a multi-party communication application 109 (e.g. a multi-part communication space server 170). In another embodiment, a multi-party communication session uses peer-to-peer communication.

A multi-party communication session allows for one or more of audio and visual communication. Examples of a multi-party communication session include but are not limited to one or more of a chat session, voice conference, video conference, etc. In one embodiment, a multi-party communication session displays video or other representations of participating users. In one such embodiment, the multi-party communication session includes both audio and video communication.

In one embodiment, the multi-party communication session includes a primary participant (e.g. a moderator) and one or more secondary participants and the multi-party communication application 109 allows the participants to communicate with one another.

The participant adding module 304 adds users to the multi-party communication session as participants. In one embodiment, the participant adding module 304 adds a secondary participant to a multi-party communication session associated with an advertisement in response to that user selecting a selection element associated with the advertisement. For example, assume a user selects a selection element of an advertisement associated with a multi-party communication session, in one embodiment, the participant adding module 304 adds the user to the multi-party communication session associated with that advertisement as a participant. Examples of selection elements include, but are not limited to hypertext links, graphical buttons, check boxes, pull down menus, etc.

In one embodiment, a user can select to be a passive participant or an active participant in the multi-party communication session, and the participant adding module 304 adds the user to the multi-party communication session accordingly. In one embodiment, an advertisement associated with a multi-party communication session includes a plurality of selection elements, and in response to the selection of a first selection element, the participant adding module 304 adds the user as an active participant, and in response to the selection of a second selection element, the participant adding module 304 adds the user as a passive participant.

In one embodiment, a passive participant is a participant who can view and/or listen to the multi-party communication session but is not seen and/or heard by the other participants, i.e., in one embodiment, a passive participant receives unilateral communication from the active participants of the multi-party communication session. In one embodiment, an active participant is a participant whose communications can be seen and/or heard by other participants in the multi-party communication session in addition to viewing and/or listening to the multi-party communication session, i.e., in one embodiment, an active participant sends and receives bilateral communications of the multi-party communication session. In one embodiment, an active participant can send and receive bilateral communication while at the front of a queue and otherwise receives unilateral communication. For example, the active participant is muted until he/she reaches the front of the queue at which time he/she is unmuted and may ask a question. In one embodiment, an active participant may ask and/or respond to a question and a passive participant may not. In one embodiment, the moderator is an active participant.

In one embodiment, a multi-party communication session is public allowing any user to join the multi-party communication session as a participant. In some embodiments, the participant adding module 304 adds a user to a multi-party communication session subject to user log-in. For example, in one embodiment, a user must log into the multi-party communication space server 170 in order to join a multi-party communication session.

In one embodiment, the multi-party communication session is a question and answer multi-party communication session. A question and answer multi-party communication session is occasionally referred to herein as a "QA session." A QA session is a multi-party communication session that includes a question and answer format where a participant asks a question and receives an answer from another participant. In one embodiment, the multi-party communication session associated with an advertisement is a QA session. In one embodiment, a multi-party communication session associated with an interview is a QA session. In one embodiment, a multi-party communication session associated with a educator's lecture or office hours is a QA session In one embodiment, the participant adding module 304 sends a new participant signal to the participant queuing module 306 in response to adding a participant to the multi-party communication session. In one embodiment, the participant adding module 304 sends a new participant signal to the participant queuing module 306 in response to adding an active participant to the multi-party communication session. For example, assume a user selects the first selection element from the example above, in one embodiment, the participant adding module 304 adds the user to an associated QA session and sends a new participant signal to the participant queuing module 306. In one such embodiment, the participant adding module 304 does not send a new participant signal to the participant queuing module 306 in response to adding a passive participant to the multi-party communication session, because the participant queuing module 306 does not queue a passive participant, since passive participants are not able to ask a question.

In one embodiment, the participant adding module 304 sends the new participant signal to the participant queuing module 306. For example, the participant adding module 304 is communicatively coupled to the participant queuing module 306 to send the new participant signal to the participant queuing module 306. In another embodiment, the participant adding module 304 (or the communication interface 302) stores the new participant signal in the storage device 214 (or any other non-transitory storage medium communicatively accessible). The other components of the multi-party communication application 109 including the participant queuing module 306 can retrieve the new participant signal by accessing the storage device 214 (or other non-transitory storage medium).

In one embodiment, the participant adding module 304 removes a participant from the multi-party communication session. For example, the participant adding module 304 removes a participant from the multi-party communication session when the user logs off or in response to a request from a moderator to remove the participant from the multi-party communication session.

The participant queuing module 306 includes code and routines for queuing participants of a multi-party communication session. In one embodiment, the participant queuing module 306 is a set of instructions executable by the processor 206. In another embodiment, the participant queuing module 306 is stored in the memory 208 and is accessible and executable by the processor 206. In either embodiment, the participant queuing module 306 is adapted for cooperation and communication with the processor 206, other components of the computing device 200 and other components of the multi-party communication application 109.

The participant queuing module 306 queues participants of a multi-party communication session. In one embodiment, the participant queuing module 306 queues participants of a QA session. For example, in one embodiment, the session management queues participants of a QA session and queued participants each ask a question in the order queued so that each queued participant is given an opportunity to ask his/her question and receive an answer. In one embodiment, the primary user answers questions in a QA session. For example, the moderator answers each participant's questions in the queued order and participants other than the moderator and the participant at the front of the queue are muted. In one embodiment, the moderator is not queued by the participant queuing module 306. In one embodiment, any active participant can answer another participant's question. For example, when a person reaches the front of the queue he/she asks a question and the other participants, which may or may not include the moderator, answer the question, discuss alternative answers, etc. In one embodiment, by queuing participants, the participant queuing module 306 may beneficially provide one or more of an increased probability that each participant with a question will have his/her question answered and a decreased probability that participants will interrupt each other by asking questions out of turn.

In one embodiment, one or more of the features and functionality of the participant queuing module 306 are performed in response to the participant adding module 304 adding an active participant to the multi-party communication session. For example, each time an active participant is added to the multi-party communication session, the participant queuing module 306 receives that participant's concentration information and determines an order for the queue.

In one embodiment, one or more of the features and functionality of the participant queuing module 306 are performed in response to an active participant requesting to be queued. For example, assume a question may be answered by any active participant. It is possible active participants may join the multi-party communication session because they have expertise they are willing to share and not because they have a question. In one embodiment, the participant queuing module 306 receives an active participant's concentration information, determines an order and queues an active participant in response to a request to be queued; not automatically upon joining the multi-party communication session.

Figure 4:
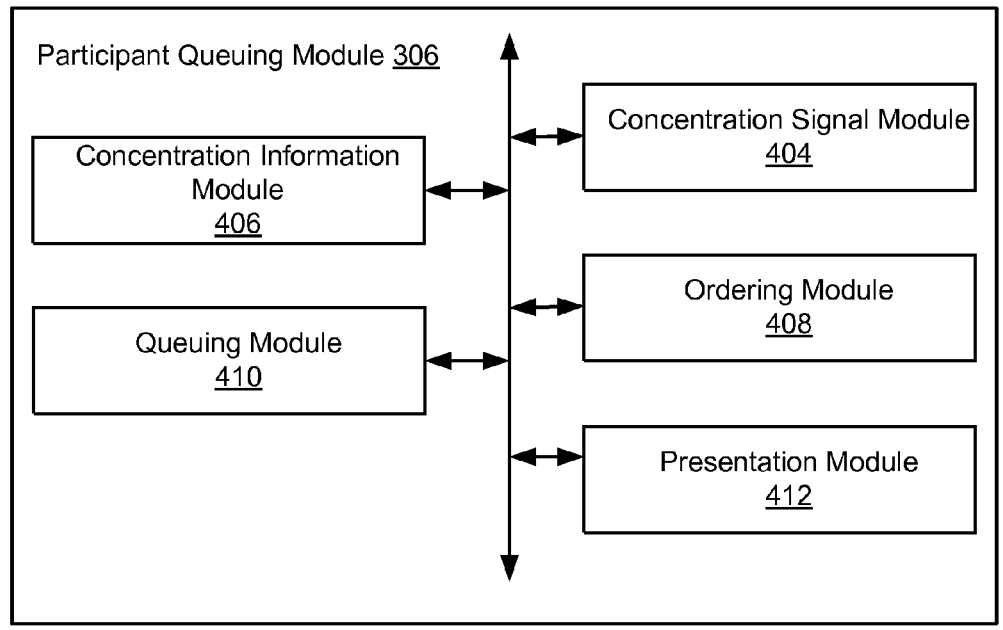
FIG. 4 is a block diagram illustrating a participant queuing module according to one embodiment.

Referring now to FIG. 4, the participant queuing module 306 is shown in more detail according to one embodiment. FIG. 4 is a block diagram of the participant queuing module 306 of the multi-party communication application 109 according to one embodiment.

In one embodiment, the participant queuing module 306 includes a concentration signal module 404, a concentration information module 406, an ordering module 408, a queuing module 410 and a presentation module 412.

The concentration signal module 404 includes code and routines for receiving one or more concentration signals associated with a multi-party communication session. In one embodiment, the concentration signal module 404 is a set of instructions executable by the processor 206. In another embodiment, the concentration signal module 404 is stored in the memory 208 and is accessible and executable by the processor 206. In either embodiment, the concentration signal module 404 is adapted for cooperation and communication with the processor 206, other components of the computing device 200 and other components of the multi-party communication application 109.

The concentration signal module 404 receives one or more concentration signals associated with a multi-party communication session. In one embodiment, a concentration signal is a rule used by the ordering module 408, which is described below, to determine an order for a plurality of participants. In one embodiment, a concentration signal causes participants satisfying the rule to be concentrated together in the order determined by the ordering module 408. In one embodiment, a concentration signal is based at least in part on one or more of a participation metric, a demographic, a time and a number of queued participants. It will be recognized that the preceding are merely examples of bases for a concentration signal and that other examples exist.

In one embodiment, a concentration signal is based at least in part on a participation metric. Examples of participation metrics include, but are not limited to, a frequency at which a participant is queued, a frequency at which a participant reaches the front of the queue, a number of times a participant has been queued, a number of times a participant has been at the front of a queue, a number of questions asked by the participant, etc. For example, assume the multi-party communication session is associated with an advertisement, in one embodiment, a concentration signal includes that, when an order is determined, participants that have not been to the front of a queue associated with the advertiser are concentrated early in the order (ahead of a concentration of participants that have been to the front of a queue associated with the advertiser). Such an embodiment may beneficially provide a positive first impression to potential new customers by having new customers early in the queue and therefore reducing the time the new customer has to wait in the queue. It will be recognized that the preceding are merely examples of participation metrics and that other examples exist.

In one embodiment, a concentration signal is based at least in part on a demographic. Examples of demographic information include, but are not limited to, gender, age, income, education level, political affiliation, geographic location, ethnicity, etc. For example, assume the multi-party communication session is associated with a political advertisement and that the politician is doing poorly among a certain demographic. In one embodiment, a concentration signal may include that, when an order is determined, participants of that certain demographic are concentrated ahead of participants not of that certain demographic. Such an embodiment may beneficially allow an advertiser increased access to and may provide shorter queue waits to that demographic by concentrating participants of that demographic earlier in the queue order. It will be recognized that the preceding are merely examples of demographics and that other examples exist.

In one embodiment, a concentration signal is based at least in part on a time. Examples of time information include, but are not limited to when a participant joined the multi-party communication session, how long the participant has been queued, when the participant requested to be queued, elapsed time since a participant has been at the front of a queue, etc. For example, in one embodiment, a concentration signal may include that once a participant has been waiting a predetermined amount of time the participant is moved forward in the order (e.g. to the front). Such an embodiment may beneficially allow an order to concentrate participants by demographic (and/or another concentration signal) while reducing the amount of time any one participant must wait beyond the predetermined amount of time. It will be recognized that the preceding are merely examples of concentration signals based at least in part on a time and that other examples exist.

In one embodiment, a concentration signal is based at least in part on a number of participants. For example, in one embodiment, a concentration signal may include that one or more other concentration signals are to be used to determine an order when a threshold number of participants are queued. For example, in one embodiment a concentration signal may include that when ten or fewer participants are queued, the participants' order is determined based only on the chronological order in which the participants requested to be queued, and when more than ten participants are queued, the participants' order is determined based on one or more of a participation metric and a demographic.

In one embodiment, the one or more concentration signals include a weighting. For example, assume the concentration signal module 404 receives concentration signals based on age and gender; in one embodiment, the age and gender based concentration signals are each weighted (i.e. associated with a weighting), so that one of the concentration signals has a greater effect than another when participants are ordered by the ordering module 408 based at least in part on the concentration signals. The ordering module 408 is discussed further below.

In one embodiment, the concentration signal module 404 receives one or more concentration signals that are user selected. For example, in one embodiment, a moderator or other representative of an advertiser may select which demographic(s), participation metric(s), time, etc. to use as concentration signals for queuing participants of a multi-party communication session associated with an advertisement.

In one embodiment, the concentration signal module 404 receives one or more concentration signals based at least in part on a learning algorithm. For example, assume a moderator is able to modify the order in which participants are queued; in one embodiment, the moderator's modifications are used to train a learning algorithm which determines the one or more concentration signals received and/or a weighting associated with a concentration signal.

In one embodiment, the concentration signal module 404 sends the one or more concentration signals associated with a multi-party communication session to one or more of the concentration information module 406 and the ordering module 408. For example, the concentration signal module 404 is communicatively coupled to one or more of the concentration information module 406 and the ordering module 408 to send the one or more concentration signals associated with a multi-party communication session to one or more of the concentration information module 406 and the ordering module 408. In another embodiment, the concentration signal module 404 (or the communication interface 302) stores the one or more concentration signals associated with a multi-party communication session in the storage device 214 (or any other non-transitory storage medium communicatively accessible). The other components of the participant queuing module 306, including one or more of the concentration information module 406 and the ordering module 408, can retrieve the one or more concentration signals associated with a multi-party communication session by accessing the storage device 214 (or other non-transitory storage medium).

The concentration information module 406 includes code and routines for receiving concentration information of a participant of the multi-party communication session. In one embodiment, the concentration information module 406 is a set of instructions executable by the processor 206. In another embodiment, the concentration information module 406 is stored in the memory 208 and is accessible and executable by the processor 206. In either embodiment, the concentration information module 406 is adapted for cooperation and communication with the processor 206, other components of the computing device 200 and other components of the multi-party communication application 109.

The concentration information module 406 receives concentration information of a participant of the multi-party communication session. Concentration information is data and information associated with a participant including data and information that is used to determine a participant's place in an order. Examples of concentration information include, but are not limited to, one or more of demographic information associated with a participant, a participation metric associated with a participant, a time associated with a participant, etc.

In one embodiment, the concentration information the concentration information module 406 receives is based at least in part on the one or more concentration signals. For example, assume the concentration signal module 404 receives only a user selected concentration signal based on age; in one embodiment, the concentration information module 406 receives the concentration signal and obtains only a participant's age.

In another embodiment, the concentration information the concentration information module 406 receives is not based on the one or more concentration signals. For example, again, assume the concentration signal module 404 receives one concentration signal based on age; in one embodiment, the concentration information module 406 receives the demographic information including an age associated with the participant, participation metrics associated with the participant and the time associated with a participant.

In one embodiment, concentration information includes a participation metric associated with a participant. Depending on the embodiment, participation metrics include, but are not limited to, one or more of a measure of one or more of a frequency at which the associated participant is queued, a frequency at which the associated participant reaches the front of the queue, a number of questions asked by the participant, a number of times the associated participant has been queued, a number of times the associated participant has been at the front of a queue or other measure of participation associated with a participant, etc. For example, in one embodiment, the participation metric is a counter that is incremented each time that participant reaches the front of a queue.

In one embodiment, concentration information includes demographic information associated with a participant. Depending on the embodiment, demographic information includes, but is not limited to, one or more of a gender, an age, an income, an education level, a political affiliation, a geographic location, an ethnicity or other demographic associated with a participant.

In one embodiment, concentration information includes a time associated with a participant. In one embodiment, a time associated with a participant is a time stamp. Examples of time stamps include, but are not limited to, one or more of a time stamp associated with when a participant was added to the multi-party communication session, when a participant requested to be queued, when a participant was most recently at the front of a queue, etc.

In one embodiment, the concentration information module 406 receives concentration information of an active participant of the multi-party communication session. For example, in one embodiment, the participant adding module 304 sends a new participant signal including a user identifier associated with an active participant. In one embodiment, the concentration information module 406 uses that user identifier to receive the concentration information associated with that active participant. In one embodiment, a passive participant is unable to ask a question or otherwise communicate with other participants of the multi-party communication session. Therefore, in one embodiment, a passive participant's concentration information is not received and the passive participant is not queued. In one embodiment, the concentration information module 406 receives concentration information of an active participant of the multi-party communication session in response to a request to be queued. For example, in one embodiment, a request to be queued includes a user identifier, and the concentration information module 406 uses that user identifier to receive the concentration information associated with that active participant.

In one embodiment, at least a portion of the activities of the participant queuing module 306 described herein, e.g., receiving concentration information based on a participant's demographic, are performed subject to consent. In one embodiment, a participant is prompted to explicitly allow his/her data and information, or a subset thereof, to be used. For example, a participant is prompted to explicitly allow his/her data and information to be received and used as concentration information to determine that participant's position in a queue associated with a multi-party communication session. Further, in one embodiment, the participant may opt into/out of allowing the use of his/her data and information. In one embodiment, if a participant opts out, the participant queuing module 306 queues that participant after the participants that have opted in. For example, assume participants are queued in an order based on a demographic, in one embodiment, the participant queuing module 306 queues the participants that have opted in based on demographic and queues the participants that opted out (e.g. in the chronological order the participants that opted out requested to be queued) after the participants that opted in.

In one embodiment, the concentration information module 406 sends the concentration information of a participant of the multi-party communication session to the ordering module 408. For example, the concentration information module 406 is communicatively coupled to the ordering module 408 to send the concentration information of a participant of the multi-party communication session to the ordering module 408. In another embodiment, the concentration information module 406 (or the communication interface 302) stores the concentration information of a participant of the multi-party communication session in the storage device 214 (or any other non-transitory storage medium communicatively accessible). The other components of the participant queuing module 306 including the ordering module 408 can retrieve the concentration information of a participant of the multi-party communication session by accessing the storage device 214 (or other non-transitory storage medium).

The ordering module 408 includes code and routines for determining an order for a plurality of participants of the multi-party communication session. In one embodiment, the ordering module 408 is a set of instructions executable by the processor 206. In another embodiment, the ordering module 408 is stored in the memory 208 and is accessible and executable by the processor 206. In either embodiment, the ordering module 408 is adapted for cooperation and communication with the processor 206, other components of the computing device 200 and other components of the multi-party communication application 109.

The ordering module 408 determines an order for a plurality of participants of the multi-party communication session. In one embodiment, the ordering module 408 determines an order for a plurality of participants of the multi-party communication session based at least in part on the one or more concentration signals and the concentration information of each participant of the multi-party communication session. For example, assume an insurance company (i.e. an advertiser) prefers that participants of similar age be concentrated so that participants of similar age ask questions during a particular time period (e.g. one-after-another when those participants reach the front of the queue). Also assume the ordering module 408 receives a concentration signal based on a demographic (i.e. age bracket) from the concentration signal module 404 and the concentration information of each participant (i.e. the age of a participant) from the concentration information module 406. In one embodiment, the ordering module 408 determines an order that concentrates the plurality of participants of the multi-party communication session based at least in part on age.

In one embodiment, the ordering module 408 determines an order based at least in part on a weighting associated with the one or more concentration signals. For example, assume an advertiser is primarily interested in improving consumer relations with 18 to 24 year-olds, and more specifically, 18 to 24 year-old women. In one embodiment, the weighting associated with the concentration signal based on age is given more weight than the concentration signal based on gender, and the ordering module 408 determines an order where 18 to 24 year-old women are concentrated at the front of the queue followed by a concentration of 18 to 24 year-old men.

In one embodiment, the ordering module 408 determines an order in response to one or more of the participant adding module 304 adding an active participant to the multi-party communication session, an active participant requesting to be added to the queue, an active participant leaving the multi-party communication session and an active participant leaving the queue. In one embodiment, the order is dynamic and the determined order is modified by the ordering module 408 as active participants are one or more of added to the multi-party communications session, request to be added to the queue, are removed from the multi-party communications session and removed from the queue. For example, assume participant A is queued in front of participant B, i.e. an order of AB, when participant C is added to the multi-party communication session; in one embodiment, the ordering module 408 determines an order ACB based on concentration information including concentration information of the additional participant (i.e. participant C) thereby modifying the order. In one embodiment, the order is dynamic and the determined order is modified by the ordering module 408 as active participants are removed from the multi-party communications session and/or removed from the queue. For example, assume an active participant third in the order logs off; in one embodiment, the ordering module 408 determines that the participant previously in the fourth position is now in the third position.

In one embodiment, the ordering module 408 determines an order in response to receiving a request to modify. Determining an order in response to receiving a request to modify is occasionally referred to herein as modifying the order. In one embodiment, the ordering module 408 receives a request to modify the order of queued participants. In one embodiment, a request to modify the order is received from a moderator associated with the multi-party communication session. For example, assume a moderator is presented with a graphical user interface (GUI) displaying graphical representations of the queued participants in order, also assume the moderator is able to manually drag and drop the graphical representations changing the presented order of the graphical representations; in one embodiment, the ordering module 408 receives the dragging and dropping of a queued participant's graphical representation as a request to modify the order of queued participants. It will be recognized that dragging and dropping a graphical representation is just one example of a request to modify and that others exist.

In one embodiment, the ordering module 408 modifies the order of the queued participants of the multi-party communication session in response to a request to modify. In one embodiment, the ordering module 408 modifies the order by determining an order that incorporates the modification requested. For example, ordering module 408 modifies the order of the queued participants to be that of the graphical representations presented to the moderator after the moderator's requested for modification.

In one embodiment, modification information based on a request to modify is sent to the concentration signal module 404 to train a learning algorithm. For example, assuming the modification request modified the order, in one embodiment, modification information is sent to the concentration signal module 404 to train a learning algorithm which modifies one or more concentration signals received and/or a weighting associated with a concentration signal so that the ordering module 408 subsequently determines an order that is less likely be similarly modified by the moderator.

In one embodiment, the ordering module 408 determines an order and a predetermined subset (e.g. a number or percentage) of that order is not subsequently modified. In one embodiment, the predetermined subset is at the front of the queue, i.e., the participants first in the order. For example, assume that participants A, B, C, D and E are at the front of the queue, and the first five participants in the queue are displayed to participants. Also, assume participant X requests to be queued and, based on the concentration information and concentration signals, participant X should be ordered between participants C and D. In one embodiment, the ordering module 408 does not modify the order to be ABCXDE because such an order moves participants D and E backward.

In one embodiment, the ordering module 408 sends the order to the queuing module 410. For example, the ordering module 408 is communicatively coupled to the queuing module 410 to send the order to the queuing module 410. In another embodiment, the ordering module 408 (or the communication interface 302) stores the order in the storage device 214 (or any other non-transitory storage medium communicatively accessible). The other components of the participant queuing module 306 including the queuing module 410 can retrieve the order by accessing the storage device 214 (or other non-transitory storage medium).

The queuing module 410 includes code and routines for queuing the plurality of participants of the multi-party communication session. In one embodiment, the queuing module 410 is a set of instructions executable by the processor 206. In another embodiment, the queuing module 410 is stored in the memory 208 and is accessible and executable by the processor 206. In either embodiment, the queuing module 410 is adapted for cooperation and communication with the processor 206, other components of the computing device 200 and other components of the multi-party communication application 109.

The queuing module 410 queues the plurality of participants of the multi-party communication session. In one embodiment, the queuing module 410 queues the plurality of participants of the multi-party communication session in the determined order. For example, the queuing module 410 receives the determined order from the ordering module 408 each time an order is determined and queues the participants in that order.

In one embodiment, the participant at the front of the queue asks a question. For example, assume the moderator answers questions; in one embodiment, while the participant is at the front of the queue the multi-party communication application 109 receives audio and/or visual communication streams from that participant and outputs the audio and/or visual communication streams so that the other participants can hear and/or see the participant's question and other participants are muted (e.g. their communication streams are not received and/or output).

In one embodiment, the queuing module 410 advances the queue. In one embodiment, the queuing module 410 advances the queue after the participant at the front of the queue has received an answer to his/her question. In one embodiment, the queuing module 410 advances the queue in response to receiving a request to advance the queue from a moderator associated with the multi-party communication session. For example, the moderator selects a GUI button when the participant has received his/her answer(s) and the queuing module 410 advances the queue allowing the next participant to ask his/her question(s).

In one embodiment, the queuing module 410 automatically advances the queue in response to detecting a queue advancement signal. A queue advancement signal is based on a social cue that indicates that a response to a question is complete, that the participant at the front of the queue has no further questions or both. Depending on the embodiment, a social cue may include one or more of speech signal and a gesture signal. In one embodiment, the queuing module 410 receives multi-party communication information including one or more of audio and visual communications and detects a queue advancement signal based on the multi-party communication information. For example, the moderator speaking "next" or "any more questions" followed by a "no" from the participant is a queue advancement signal.

In one embodiment, a queue advancement signal is based on one or more of a gesture and speech. For clarity and convenience, examples of queue advancement signals based on speech are in English. However, it will be recognized that queue advancement signals may vary by language and culture and that the implementation of this description is not limited to merely one language or culture.

In one embodiment, a queue advancement signal based on speech is based on diction (i.e. what is said). In one embodiment, a queue advancement signal based on speech is based at least in part on the diction of the speech. Examples of speech indicating the response to a question is complete include but are not limited to one or more of a participant/moderator stating "Any other questions," "Can I help you with anything else," "Next question," "Does that answer your question" followed by a "Yes," etc.

In one embodiment, a queue advancement signal is based at least in part on gestures. For example, assume that the QA session includes video and that a participant turns away from a camera or leaves the camera's field of view when he/she no longer has questions, in one embodiment, queuing module 410 advances the queue in response to detecting that the participant at the front of the queue turned away from the camera or has left the field of view. In another example, assume that the QA session includes video and a particular hand gesture performed by the moderator is programmed to advance the queue, in one embodiment, queuing module 410 advances the queue in response to detecting the moderator performing that hand gesture.

In one embodiment, the queue advancement signals are detected based on a learning algorithm. In one embodiment, the learning algorithm is trained based at least in part on moderators' requests to advance the queue. For example, in one embodiment, the learning algorithm is trained to detect queue advancement signals based on multi-party communication information that precedes a moderator's request to advance the queue. For example, if "any more questions" is said before a moderator requests to advance the queue, in one embodiment, the learning algorithm is trained to detect "any more questions" as a queue advancement signal.

In one embodiment, the queuing module 410 sends the queue to the presentation module 412. For example, the queuing module 410 is communicatively coupled to the presentation module 412 to send the queue to the presentation module 412. In another embodiment, the queuing module 410 (or the communication interface 302) stores the queue in the storage device 214 (or any other non-transitory storage medium communicatively accessible). The other components of the participant queuing module 306 including the presentation module 412 can retrieve the queue by accessing the storage device 214 (or other non-transitory storage medium).

The presentation module 412 includes code and routines for presenting an expectation indicator. In one embodiment, the presentation module 412 is a set of instructions executable by the processor 206. In another embodiment, the presentation module 412 is stored in the memory 208 and is accessible and executable by the processor 206. In either embodiment, the presentation module 412 is adapted for cooperation and communication with the processor 206, other components of the computing device 200 and other components of the multi-party communication application 109.

In one embodiment, the presentation module 412 presents an expectation indicator to one or more participants. Examples of expectation indicators include, but are not limited to, one or more of a position in the queue, the length of the queue, an estimated wait time, the maximum wait time of a queued participant, an average wait time, etc. Presenting an expectation indicator may beneficially allow a participant to anticipate when he/she may ask a question.

In one embodiment, the presentation module 412 presents one or more expectation indicators to all participants of the multi-party communication session. For example, assume the expectation indicators include the length of the queue and the average wait time (i.e. the average time a queued participant has spent waiting in the queue). In one embodiment, the presentation module 412 presents the length of the queue and the average wait time to all participants of the multi-party communication session. In one embodiment, the presentation module 412 presents one or more expectation indicators to queued participants of the multi-party communication session. For example, in one embodiment, only active participants are queued so passive participants are not presented with an expectation indicator.

In one embodiment, the presentation module 412 presents a queue position to at least a subset of the queued participants. In one embodiment, the subset of the queued participants includes participants at the front of the queue. For example, assume that more than three participants are queued; in one embodiment, the presentation module 412 presents to the three participants queued at the front of the queue each participant's position in the queue. For example, the participant at the front of the queue is presented that he/she is in a first position, the next participant in the queue is presented that he/she is in the second position, and the next participant in the queue is presented that he/she is in the third position.

In one embodiment, after the presentation module 412 presents a participant's queue position to that participant, the ordering module 408 does not modify that participant's order backward. For example, after the presentation module 412 presents to a participant that the participant is second in the queue, the ordering module 408 does not subsequently modify that participant's order in the queue to be third or later in the queue.

In one embodiment, the presentation module 412 sends an expectation indicator for presentation. For example, the presentation module 412 is communicatively coupled to a user device 115 to send the expectation indicator for presentation. In another embodiment, the presentation module 412 (or the communication interface 302) stores an expectation indicator in the storage device 214 (or any other non-transitory storage medium communicatively accessible). The other components of the system 100 including the user devices 115 can retrieve the expectation indicator by accessing the storage device 214 (or other non-transitory storage medium).

Figure 5:
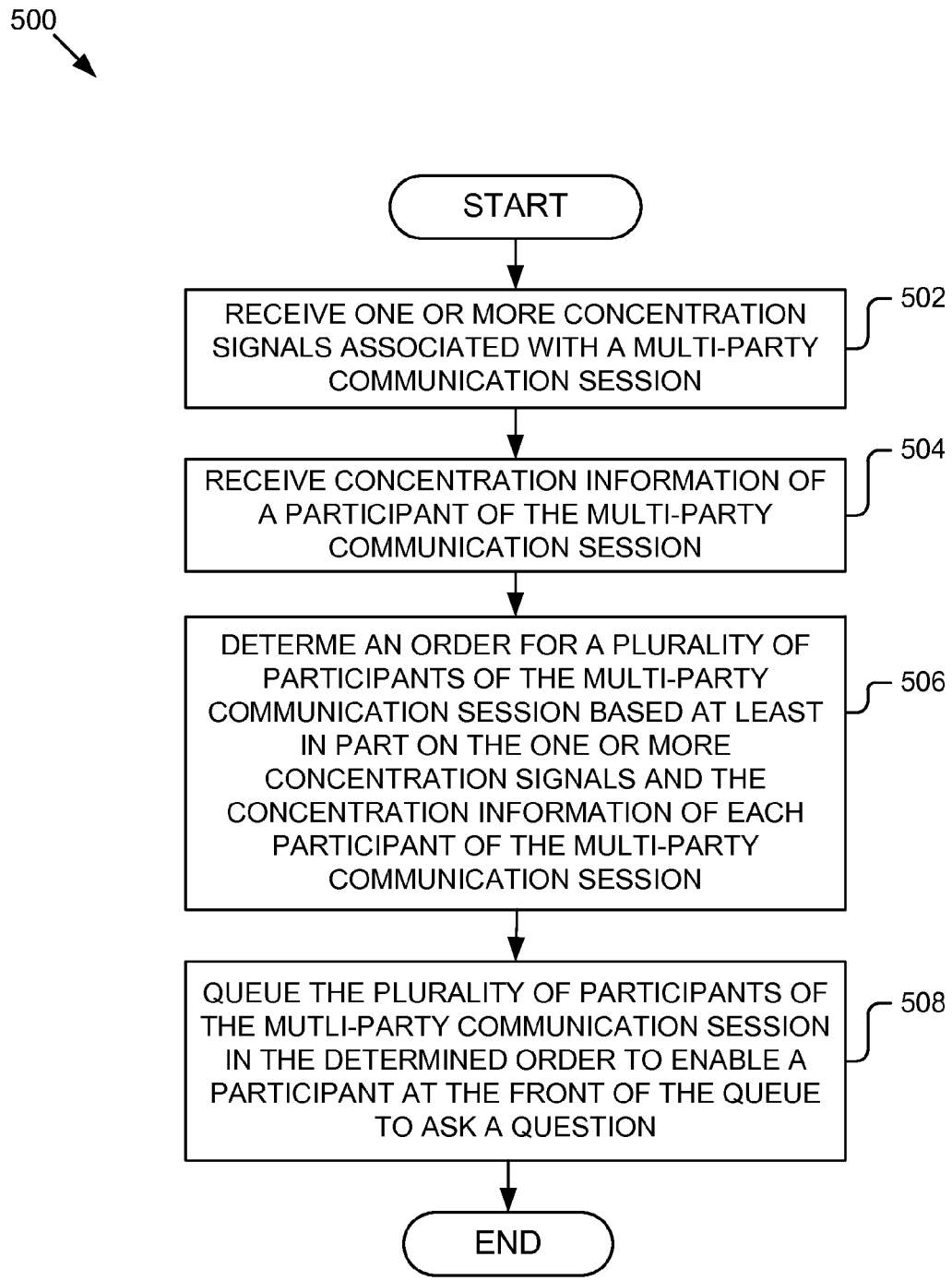
FIG. 5 is a flow chart illustrating a method for queuing participants of a multi-party communication session according to one embodiment.
Figure 6:
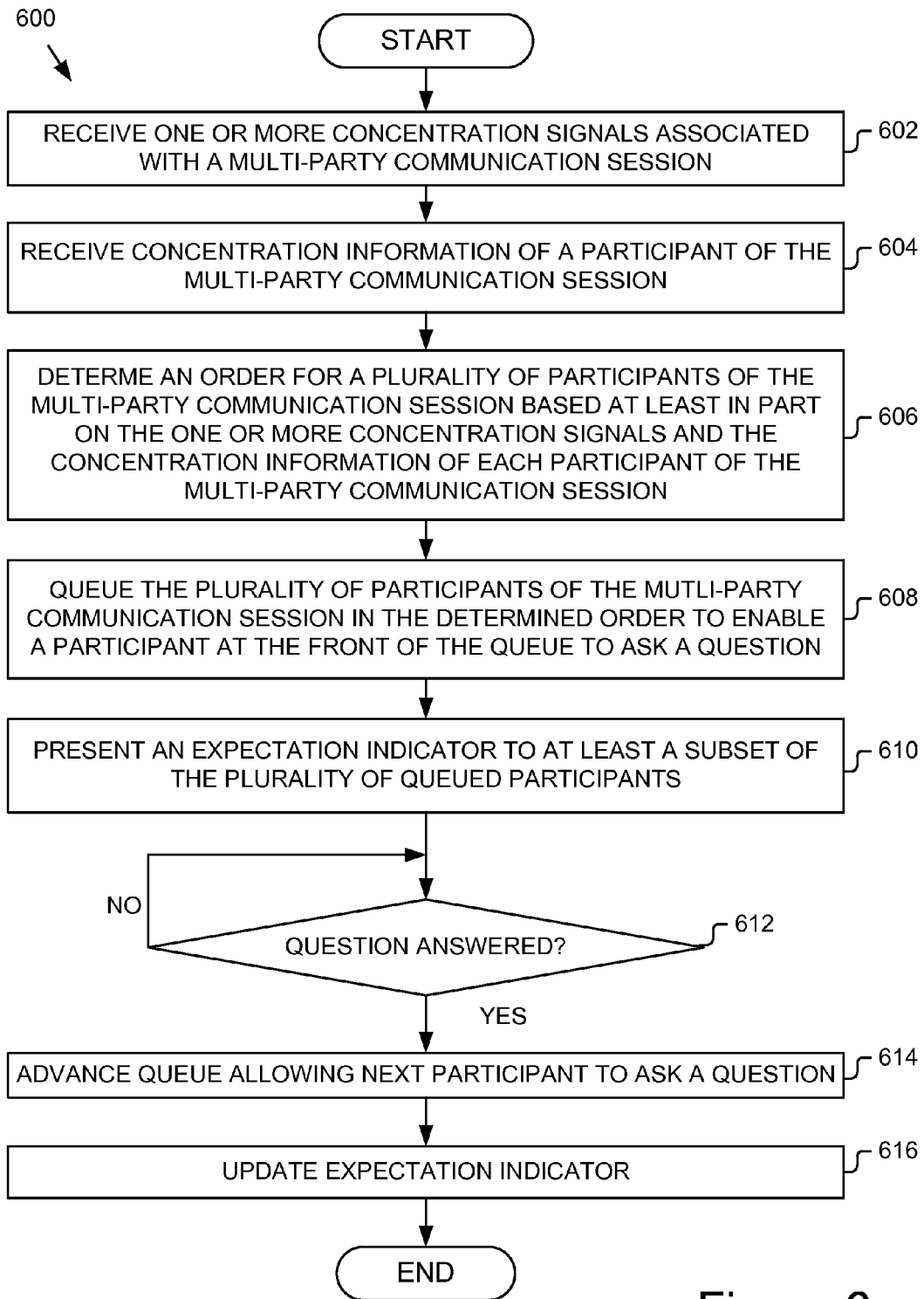
FIG. 6 is a flow chart illustrating another method for queuing participants of a multi-party communication session according to one embodiment.

FIGS. 5 and 6 depict various methods 500, 600 performed by the system described above in regard to FIGS. 1-4.

FIG. 5 is a flow chart illustrating a method 500 for queuing participants of a multi-party communication session according to one embodiment. At block 502, the concentration signal module 404 of the participant queuing module 306 receives one or more concentration signals associated with a multi-party communication session. At block 504, the concentration information module 406 receives concentration information of a participant of the multi-party communication session. At block 506, the ordering module 408 determines an order for a plurality of participants of the multi-party communication session based at least in part on the one or more concentration signals and the concentration information of each participant of the multi-party communication session. At block 508, the queuing module 410 queues the plurality of participants of the multi-party communication session in the determined order, wherein a participant at the front of the queue asks a question.

FIG. 6 is a flow chart illustrating another method 600 for queuing participants of a multi-party communication session according to one embodiment. At block 602, the concentration signal module 404 of the participant queuing module 306 receives one or more concentration signals associated with a multi-party communication session. At block 604, the concentration information module 406 receives concentration information of a participant of the multi-party communication session. At block 606, the ordering module 408 determines an order for a plurality of participants of the multi-party communication session based at least in part on the one or more concentration signals and the concentration information of each participant of the multi-party communication session. At block 608, the queuing module 410 queues the plurality of participants of the multi-party communication session in the determined order, wherein a participant at the front of the queue asks a question. At block 610, the presentation module 412 presents an expectation indicator to at least a subset of the plurality of queued participants. At block 612, the queuing module 410 determines whether the participant's question(s) have been answered.

If the queuing module 410 determines that the participant's question(s) have not been answered (612—No), block 612 is repeated. If the queuing module 410 determines that the participant's question(s) have been answered (612—Yes), the method 600 continues at block 614. At block 614, the queuing module 410 advances the queue allowing the next participant to ask a question. At block 616, the presentation module 412 updates the expectation indicator.

The foregoing description of the embodiments has been presented for the purposes of illustration and description. It is not intended to be exhaustive or to limit the present embodiments to the precise forms disclosed. Many modifications and variations are possible in light of the above teaching. It is intended that the scope of the present embodiments be limited not by this detailed description, but rather by the claims of this application. As will be understood by those familiar with the art, the present embodiments may take other specific forms without departing from the spirit or essential characteristics thereof. Likewise, the particular naming and division of the modules, routines, features, attributes, methodologies and other aspects are not mandatory or significant, and the mechanisms that implement one embodiment or its features may have different names, divisions and/or formats. Furthermore, as will be apparent, the modules, routines, features, attributes, methodologies and other aspects of the embodiments can be implemented as software, hardware, firmware or any combination of the three. Also, wherever a component, an example of which is a module, is implemented as software, the component can be implemented as a standalone program, as part of a larger program, as a plurality of separate programs, as a statically or dynamically linked library, as a kernel loadable module, as a device driver, and/or in every and any other way known now or in the future. Additionally, the embodiments are in no way limited to implementation in any specific programming language, or for any specific operating system or environment. Accordingly, the disclosure is intended to be illustrative, but not limiting, of the scope, which is set forth in the following claims.

What is claimed is:

1. A hardware system comprising:
one or more processors:
a concentration signal module executable by the one or more processors to receive one or more concentration signals associated with a multi-party communication session;
a concentration information module executable by the one or more processors and communicatively coupled to the concentration signal module to receive concentration information of each participant of the multi-party communication session, the concentration information includes time information associated with each of the participant of the multi-party communication session;
an ordering module executable by the one or more processors to determine an order for each of the participants of the multi-party communication session based at least in part on the one or more concentration signals and the concentration information of each of the participants of the multi-party communication session, the ordering module communicatively coupled to the concentration signal module to receive the one or more concentration signals and to the concentration information module to receive the concentration information of each of the participants of the multi-party communication session; and
a queuing module executable by the one or more processors to queue each of the participants of the multi-party communication session in the determined order to enable a participant at a front of a queue to ask a question, the queuing module communicatively coupled to receive the determined order from the ordering module.

2. The hardware system of claim 1, wherein the multi-party communication session is associated with an advertisement.

3. The hardware system of claim 1, wherein the ordering module is further executable by the one or more processors to receive a request to modify the order of the queued participants, wherein the request to modify is received from a moderator associated with the multi-party communication session, and operable to modify the order of the queued participants based at least in part on the request to modify the order.

4. The hardware system of claim 1, wherein the concentration information module is further executable by the one or more processors to receive-concentration information associated with the participant, and the ordering module is further executable by the one or more processors to determine the order in response to the participant joining the multi-party communication session.

5. The hardware system of claim 1 further comprising:
a presentation module executable by the one or more processors and communicatively coupled to the queuing module to present queue positions to a predetermined number of participants at the front of the queue; and
wherein the order of the predetermined number of participants at the front of the queue is not modified backward after presentation of the queue positions.

6. The hardware system of claim 1 further comprising:
a presentation module executable by the one or more processors and communicatively coupled to the queuing module to present an expectation indicator to at least a subset of the plurality of queued participants.

7. The hardware system of claim 1, wherein the queuing module is further executable by the one or more processors to receive a request to advance the queue from a moderator associated with the multi-party communication session after the question is answered, and to advance the queue such that a next participant is advanced to the front of the queue to enable the next participant to ask a next question.

8. The hardware system of claim 1, wherein the queuing module is further executable by the one or more processors to receive multi-party communication information, detect a queue advancement signal based on the multi-party communication information, the queue advancement signal indicating that the question is answered, and automatically advance the queue such that a next participant is advanced to the front of the queue to enable the next participant to ask a next question.

9. The hardware system of claim 1, wherein at least one concentration signal is based at least in part on a demographic, and the concentration information received includes information about the participant's demographic.

10. A computer-implemented method comprising:
receiving, using one or more devices, one or more concentration signals associated with a multi-party communication session;
receiving, using the one or more devices, concentration information of each participant of the multi-party communication session, the concentration information includes time information associated with each of the participants of the multi-party communication session;
determining, using the one or more devices, an order for each of the participants of the multi-party communication session based at least in part on the one or more concentration signals and the concentration information of each of the participants of the multi-party communication session; and
queuing, using the one or more devices, each of the participants of the multi-party communication session in the determined order to enable a participant at front of the queue to ask a question.

11. The method of claim 10, wherein the multi-party communication session is associated with an advertisement.

12. The method of claim 10 further comprising:
receiving, using the one or more devices, a request to modify the order of the queued participants, wherein the request to modify is received from a moderator associated with the multi-party communication session; and
modifying, using the one or more devices, the order of the queued participants based at least in part on the request to modify the order.

13. The method of claim 10, wherein concentration information associated with the participant is received and the order is determined in response to the participant joining the multi-party communication session.

14. The method of claim 10 further comprising:
presenting, using the one or more devices, queue positions to a predetermined number of participants at the front of the queue; and
wherein the order of the predetermined number of participants at the front of the queue is not modified backward after presenting the queue positions.

15. The method of claim 10 further comprising:
presenting, using the one or more devices, an expectation indicator to at least a subset of the plurality of queued participants.

16. The method of claim 10 further comprising:
receiving, using the one or more devices, a request to advance the queue from a moderator associated with the multi-party communication session after the question is answered; and
advancing, using the one or more devices, the queue such that a next participant is advanced to the front of the queue, wherein the next participant asks a next question.

17. The method of claim 10 further comprising:
receiving, using the one or more devices, multi-party communication information;
detecting, using the one or more devices, a queue advancement signal based on the multi-party communication information, the queue advancement signal indicating that the question is answered; and
automatically advancing, using the one or more devices, the queue such that a next participant is advanced to the front of the queue to enable the next participant to ask a next question.

18. The method of claim 10, wherein at least one concentration signal is based at least in part on a demographic, and the concentration information received includes information about the participant's demographic.

19. A computer-implemented method comprising:
receiving, using one or more devices, one or more concentration signals associated with a multi-party communication session, wherein the multi-party communication session is associated with an advertisement;
receiving, using the one or more devices, concentration information of each participant of the multi-party communication session, wherein the concentration information includes demographic and time information associated with each of the participants;
determining, using the one or more devices, an order for each of the participants of the multi-party communication session based at least in part on the one or more concentration signals and the concentration information of each of the participants of the multi-party communication session; and
queuing, using the one or more devices, each of the participants of the multi-party communication session in the determined order to enable a participant at front of the queue to ask a question.

* * * * *